United States Patent
Sang et al.

(10) Patent No.: US 9,814,645 B2
(45) Date of Patent: Nov. 14, 2017

(54) CIRCULATING HOT WATER NURSING MACHINE

(71) Applicant: SUZHOU ALTON ELECTRICAL & MECHANICAL INDUSTRY CO., LTD., Jiangsu (CN)

(72) Inventors: Shuhua Sang, Jiangsu (CN); Weidong Lu, Jiangsu (CN); Jianjun Tan, Jiangsu (CN); Qiang Song, Jiangsu (CN); Zhouen Li, Jiangsu (CN)

(73) Assignee: SUZHOU ALTON ELECTRICAL & MECHANICAL INDUSTRY CO., LTD. (CN)

( * ) Notice: Subject to any disclaimer, the term of this patent is extended or adjusted under 35 U.S.C. 154(b) by 0 days.

(21) Appl. No.: 15/301,588

(22) PCT Filed: Apr. 3, 2015

(86) PCT No.: PCT/CN2015/075854
§ 371 (c)(1),
(2) Date: Oct. 3, 2016

(87) PCT Pub. No.: WO2015/149717
PCT Pub. Date: Oct. 8, 2015

(65) Prior Publication Data
US 2017/0172831 A1    Jun. 22, 2017

(30) Foreign Application Priority Data

Apr. 4, 2014    (CN) .................... 2014 2 0164011 U
Apr. 4, 2014    (CN) .................... 2014 2 0164043 U
(Continued)

(51) Int. Cl.
*A61G 9/00*    (2006.01)
*E03D 9/08*    (2006.01)
(Continued)

(52) U.S. Cl.
CPC .................. *A61G 9/00* (2013.01); *C02F 1/02* (2013.01); *C02F 1/32* (2013.01); *E03D 9/08* (2013.01);
(Continued)

(58) Field of Classification Search
CPC .... A61G 9/00; A61G 9/02; C02F 1/02; C02F 1/32; E03D 9/08; E03D 11/02; E03D 11/11; F24D 17/0073; F24H 1/06
(Continued)

(56) References Cited

U.S. PATENT DOCUMENTS

2009/0193572 A1    8/2009 Nakamura et al.
2013/0129331 A1*   5/2013 de Souza .................. F24H 1/06
                                              392/445

FOREIGN PATENT DOCUMENTS

CN    101099708    1/2008
CN    101589981    12/2009
(Continued)

OTHER PUBLICATIONS

International Search Report, dated Jul. 6, 2015 for PCT Application No. PCT/CN2015/075853, filed Apr. 3, 2015.
(Continued)

*Primary Examiner* — Tuan N Nguyen
(74) *Attorney, Agent, or Firm* — Barnes & Thornburg LLP; Jeffrey R. Stone

(57) ABSTRACT

A circulating hot water nursing machine includes a main unit and a working head, wherein a water tank support, a clean water tank, a small water pump and a PTC heater are arranged on the main unit; a heating tank is arranged at a lower part of the water tank support, the clean water tank is arranged at an upper part of the water tank support, a shunt valve is arranged on the water tank support, a water inlet of the shunt valve is connected with the heating tank and the (Continued)

clean water tank, and a water outlet of the shunt valve, the small water pump, the PTC heater and the heating tank are connected successively; a control system and a main power supply are arranged on the main unit, and the small water pump, the PTC heater and the shunt valve are connected with the main power supply.

20 Claims, 12 Drawing Sheets

(30) Foreign Application Priority Data

| Apr. 4, 2014 | (CN) | 2014 2 0164423 U |
|---|---|---|
| Apr. 4, 2014 | (CN) | 2014 2 0164830 U |
| May 26, 2014 | (CN) | 2014 2 0271940 U |

(51) Int. Cl.

| E03D 11/02 | (2006.01) |
|---|---|
| E03D 11/11 | (2006.01) |
| C02F 1/02 | (2006.01) |
| F24D 17/00 | (2006.01) |
| F24H 1/06 | (2006.01) |
| C02F 1/32 | (2006.01) |
| C02F 103/02 | (2006.01) |

(52) U.S. Cl.
CPC .............. *E03D 11/02* (2013.01); *E03D 11/11* (2013.01); *F24D 17/0073* (2013.01); *F24H 1/06* (2013.01); *C02F 2103/026* (2013.01)

(58) Field of Classification Search
USPC ............................................................ 4/443
See application file for complete search history.

(56) References Cited

FOREIGN PATENT DOCUMENTS

| CN | 201356746 | 12/2009 |
|---|---|---|
| CN | 201790992 | 4/2011 |
| CN | 102293702 | 12/2011 |
| CN | 101912332 | 6/2012 |
| CN | 102525719 | 7/2012 |
| CN | 102920565 | 2/2013 |
| CN | 202892179 | 4/2013 |
| CN | 203075099 | 7/2013 |
| CN | 203829196 | 9/2014 |
| CN | 203829198 | 9/2014 |
| CN | 203829199 | 9/2014 |
| CN | 203829201 | 9/2014 |
| CN | 203829202 | 9/2014 |
| CN | 203829203 | 9/2014 |
| CN | 203829204 | 9/2014 |
| CN | 203829212 | 9/2014 |
| CN | 203885767 | 10/2014 |
| EP | 2087874 | 12/2009 |
| EP | 2087875 | 12/2009 |
| EP | 2428191 | 3/2012 |
| EP | 2556813 | 2/2013 |
| JP | 6014819 | 1/1985 |
| WO | WO2006/119873 | 11/2006 |

OTHER PUBLICATIONS

Extended European Search Report, dated Mar. 10, 2017 for PCT/CN2015/075854.
Extended European Search Report, dated Feb. 23, 2017 for PCT/CN2015/075853.

* cited by examiner

CIRCULATING HOT WATER NURSING MACHINE

TECHNICAL FIELD

The present disclosure relates to the technical field of medical nursing appliances, and particularly to a circulating hot water nursing machine.

BACKGROUND

With the development of people' living standards, sickbed patients unable to defecate and urinate by themselves due to cardiovascular and cerebrovascular diseases and other diseases are increasing year by year, which brings great pressure to the family and the society; the patients cannot defecate by themselves, so assistance from accompanying persons is needed; and however, the workload of the accompanying persons is increased due to uncertainty of a defecation time of the patients, and great pain and burden are brought to physiology and particularly spirit of the patients. Therefore, medical institutions and patients' families often use a special urination or defecation nursing machine to reduce the burden of nursing persons, thereby effectively improving a therapy environment of the patients.

The existing nursing machine is not reasonable in structure and function, and has some problems during use. Clean water used in the nursing machine needs to be heated, and an instantaneous water heater and a traditional water heater are generally used in the current nursing machine. Hot water released from the instantaneous water heater when starting up could not reach a set temperature, the heating efficiency is limited by output power and water volume, and high requirement is presented for the power of the heater. A heating element of the traditional water heater is arranged in a water tank, so risks of electric leakage and dry burning are presented. The nursing machine works randomly, and the heaters are in an insulating state in most of time, therefore, the energy loss is relatively large, lacking of energy saving and environmental protection. Moreover, the nursing machine would be polluted during use to cause bacteria breeding and then to affect the patients through the clean water, thus, the health risk exists. Therefore, it is necessary to improve the current structure.

The common urination or defecation nursing machine on the market includes a working head and a main unit. The working head is sheathed on a lower body of the patient for collecting excrement, a water spraying mechanism is arranged on the working head to wash the lower body of the patient and clean interior of the working head, and a blower is further arranged on the working head to dry the lower body of the patient. A dirt suction device, a water supply device and a control processor are arranged on the main unit, wherein the clear water is heated by the water supply device and then transported to the water spraying mechanism of the working head by a water pump, and the dirt suction device sucks the excrement and the cleaned water in the working head through vacuumizing action. Therefore, the working head of the nursing machine should be connected with various components of the main unit through a sewage pipe, a clean water pipe and an electric circuit; the sewage pipe, the clean water pipe and the electric circuit penetrate through a connecting hose after being bundled; two ends of the connecting hose, the sewage pipe, the clean water pipe and the electric circuit are connected with the main unit and the working head, respectively; and in order to prevent the connecting hose from separating from the working head and the main unit when use, most of the current connecting hoses are fixedly connected with the working head and the main unit, so as to avoid misoperation and falling to cause leakage of the excrement and water in the pipes. But, when the patient does not need to wear the working head, the problem that the working head is nowhere to place is presented; and even if a little leakage problem at a joint occurs, the working head also needs to be opened and fully detached, which causes a lot of trouble to detection and maintenance. Therefore, it is necessary to improve the working head to improve its use performance.

The working head is connected with the main unit through the hose, and then, the excrement and sewage are collected in a waste pail. Generally, the hose is connected with the main unit by sleeving with a pipe joint and fixing with a screw or by plugging on a joint of the main unit directly by means of elasticity of the hose. The two existing connection modes have the problems of tedious installation and connection, low connection strength, easy self-dropping and the like. Therefore, it is necessary to improve the current structure.

The existing nursing machine is still not reasonable in structure and function, and has some problems during use. A negative pressure source is used by the nursing machine as a power apparatus, connected with the waste pail and vacuumized to it, so that the sewage in the working head enters the waste pail through a connecting pipeline. Generally, a high-speed fan is used as the current negative pressure source, the fan is equipped with a simple air duct, acoustic foam and others to carry out denoising process on the fan, but the effect is not very good. When the connecting pipeline is jammed but the negative pressure source continues working, the vacuum pressure in the waste pail is gradually improved, until the waste pail is sucked to be flat, causing the damage of the negative pressure source and other components; and generally, in the existing nursing machine, a vacuum sensor is used to detect the pressure in the waste pail, and when the pressure exceeds a limit value, the negative pressure source is turned off by a control system to avoid causing more damage. Such an electrical control mode has high fault rate during use, and serious consequences could be caused in case of the failure of the sensor or the control system.

The nursing machine mainly includes the working head, the negative pressure source, the water tank, the waste tank, the water pump and the like; and the working head and the lower body of the patient are cleaned with the clean water, and then, the excrement and the like are sucked into the waste tank by virtue of the negative pressure source. The existing nursing machine can basically solve the above problem, but its structure and function are still not reasonable, and some problems are presented during use, wherein the high-speed fan or a vacuum pump is generally used as the negative pressure source, and cannot be in contact with a water source when use; and the negative pressure source is communicated with the waste tank and a water source pipeline; therefore, part of water is also brought when sucking high-speed air, and in the existing nursing machine, a sensor and control software are used to prevent the electric leakage by water touch and other accidents, with bad effects. The sensor and the software easily have DBUG and failure problems, causing that the risk of burnout or electric shock of the negative pressure source due to water entering is increased. Therefore, it is necessary to improve the current structure.

SUMMARY

Aiming at the defects and deficiencies of the existing art, the present disclosure provides a circulating hot water nursing machine with reasonable structure, safe use, energy saving and environmental protection.

In order to achieve the above purpose, the present disclosure adopts the following technical solutions.

A circulating hot water nursing machine of the present disclosure includes a main unit and a working head, wherein a water tank support, a clean water tank, a small water pump and a PTC heater are arranged on the main unit; a heating tank is arranged at a lower part of the water tank support, the clean water tank is arranged at an upper part of the water tank support, a shunt valve is arranged on the water tank support, water inlets of the shunt valve are connected with the heating tank and the clean water tank through water pipes, respectively, and a water outlet of the shunt valve, the small water pump, the PTC heater and the heating tank are connected successively through water pipes; and a control system and a main power supply are arranged on the main unit, and the small water pump, the PTC heater and the shunt valve are electrically connected with the main power supply through the control system, respectively.

Further, a UV sterilizer is arranged on the main unit, connected with the water pipe arranged between the PTC heater and the heating tank, and electrically connected with the control system.

Further, a water pump support is arranged at one side of the water tank support, and a big water pump is arranged in the water pump support and connected with the heating tank and the working head through water pipes, respectively.

Further, a liquid level sensor is arranged on the clean water tank, a temperature sensor is arranged on the heating tank, the liquid level sensor and the temperature sensor are connected with the control system, respectively, and a blowdown valve is arranged on a bottom surface of the heating tank.

Further, an insulating shell is arranged outside each of the PTC heater and the small water pump.

Further, the working head and a hose employ a fast connection structure, a base is arranged at a tail end of the working head, hangers are arranged at two sides of the base, and a sewage port, a circuit port and a clean water port are arranged on a back end face of the base; and a plug is arranged at a front end of the hose in a connecting manner, hasps are arranged at two sides of the plug, and a sewage joint, a circuit joint and a clean water joint are arranged on a front end face of the plug.

Further, a plurality of locating holes are formed on the back end face of the base and symmetrically distributed along two sides of a center line of the base; and a plurality of locating columns are arranged on the front end face of the plug and match with the plurality of locating holes in a pairing manner.

Further, each of the locating columns is arranged in a frustum structure with small at front and big at back, and a chamfer is formed at the edge of a port of each of the locating holes.

Further, a first circular groove is formed on an outer edge of the sewage port, an O-type sealing ring is sheathed on the first circular groove, and an inner diameter of the sewage joint is matched with an outer diameter of the sewage port.

Further, an adaptive hole is formed on the back end face of the base, the sewage port is sheathed in the adaptive hole, and an inner diameter of the adaptive hole is matched with an outer diameter of the sewage joint.

Further, a second circular groove is formed on an outer edge of the clean water joint, an O-type sealing ring is sheathed on the second circular groove, and an outer diameter of the clean water joint is matched with an inner diameter of the clean water port.

Further, a guide stripe is arranged on an inner wall of the circuit port, and a guide groove matched with the guide stripe is formed on an outer wall of the circuit joint.

Further, a shell of the main unit is provided with a fast installation and anti-drop mechanism, the structure of which is as follows: a base is arranged on a panel of the shell, a thread is arranged on an outer edge of a front end of the base, baffle plates are arranged at two sides of an inner hole of the base, and a nut sleeve, a hose sleeve, a first pipe joint and a second pipe joint are arranged on the base in a connecting manner; a second casing pipe and a second water pipe are arranged on the second pipe joint, front ends of the second casing pipe and the second water pipe pass through the baffle plates and the second pipe joint is arranged pressing against the back side of the baffle plate, a stop collar, a first casing pipe and a first water pipe are arranged on the first pipe joint, front ends of the first casing pipe and the first water pipe are arranged in the stop collar, a back end of the first casing pipe penetrates through a front end of the second casing pipe, and a back end of the first water pipe penetrates through a front end of the second water pipe; and a back end of the hose sleeve is sheathed on the stop collar, and the nut sleeve is sleeved on the hose sleeve and a back end of the nut sleeve is in thread connection with a front end of the base.

Further, guide teeth are arranged on an outer edge of the front end of the stop collar, and limit teeth are arranged on an inner wall of the hose sleeve.

Further, a pass line groove is formed on the second pipe joint, and a pass line hole is formed in the second pipe joint at a position corresponding to the pass line groove.

Further, a plurality of fixing holes are formed inside the base and at corresponding places of the second pipe joint.

Further, wave teeth are arranged on outer edges inside the first water pipe and the second water pipe.

Further, the main unit comprises a negative pressure source and a waste pail, a pressure release valve and an adapter are arranged on a top cover of the waste pail, a water inlet and an air outlet are foil led on the adapter, the water inlet is connected with the working head through a water pipe, and the air outlet is connected with the negative pressure source through an air pipe; and the negative pressure source includes a shell, a negative pressure assembly and a high-speed fan, wherein an inlet air joint is arranged at an upper end of the shell, an outlet air connector is arranged at a lower end of the shell, the negative pressure assembly is arranged in the shell, acoustic foam is provided between an outer wall of the negative pressure assembly and an inner wall of the shell, the high-speed fan is arranged in the negative pressure assembly, an air inlet at the upper end of the high-speed fan is communicated with the inlet air joint through the negative pressure assembly, an air outlet at the lower end of the high-speed fan is communicated with the outlet air connector through the negative pressure assembly, and acoustic foam is provided in an inner cavity of the negative pressure assembly between the air inlet and the air outlet of the high-speed fan.

Further, the negative pressure assembly includes a fan housing, wherein an air duct pressing plate is arranged on a top surface of the fan housing, and the upper end of the high-speed fan is fixedly connected with the air duct pressing plate; and an annular air duct baffle plate is arranged on a bottom surface of the fan housing, the lower end of the high-speed fan is placed in the air duct baffle plate and fixedly connected with the fan housing, and an air duct outlet is formed on a bottom plate of the fan housing outside the air duct baffle plate.

Further, acoustic foam is provided between an outer face of the air duct baffle plate and the fan housing.

Further, a damping rubber mat is arranged between the lower end of the high-speed fan and the fan housing.

Further, the pressure release valve includes a valve body, a valve cover, a core plug and a spring, wherein the lower end of the valve body passes through the top cover of the waste pail and fixedly connected with the same, the valve cover is bolted connection with the upper end of the valve body, a pressure relief hole is formed on the valve cover, the core plug can be arranged vertically in the valve body, the upper end of the core plug is arranged pressing against the pressure relief hole of the valve cover, and the spring is arranged between the lower end of the core plug and the bottom surface of the valve body.

Further, a filter is arranged in the water inlet of the adapter.

Further, the main unit includes a movable chassis. A polluted water bucket, the negative pressure source, a cleaning mechanism, a power supply and the control system are arranged on the chassis, wherein a water inlet of the polluted water bucket and the cleaning mechanism are connected with the working head through a hose, respectively, and a water removal apparatus is arranged between an air outlet of the polluted water bucket and the negative pressure source in a connection mode; the water removal apparatus includes a base and an upper cover plate, a water storage cup is arranged at a lower port of the base, the upper cover plate is connected with an upper port of the base, an air inlet connecting pipe and an air outlet connecting pipe are arranged on the upper cover plate, the upper end of the air inlet connecting pipe is connected with the polluted water bucket through a hose, and the upper end of the air outlet connecting pipe is connected with the negative pressure source through a hose; and the negative pressure source and the cleaning mechanism are connected with the power supply through the control system, respectively.

Further, a liquid level sensor connected with the control system is arranged at the water storage cup, and a drainage switch is arranged at a lower end of the water storage cup.

Further, a baffle plate is arranged in the base, the air inlet connecting pipe and the water storage cup are arranged at one side of the baffle plate correspondingly from up to down, and the air outlet connecting pipe is arranged at the other side of the baffle plate, and a water separation ball is arranged in the base and at the same side of the baffle plate with the air outlet connecting pipe.

Further, a joint is connected at the upper end of the air outlet connecting pipe and connected with the negative pressure source through a hose, grid baffle plates are arranged in the air outlet connecting pipe and the joint, and dry sponge is filled between the grid baffle plates.

The present disclosure has the following beneficial effects: the external PTC heater is adopted in the present disclosure, and water and electricity are separated when stopping, thereby reducing the risk of the electric leakage; the outlet water temperature of circulation heating is constant, the heating speed is high, and it is more energy-saving and environment friendly; and the internal sterilization and disinfection and the circulation heating are carried out at the same time, thereby providing the clean and sanitary washing water source for the patients.

The working head and the hose employ the fast connection structure, multiple position matching is provided on the base and the plug to realize accurate connection, and the sewage port and the sewage joint, and the clean water port and the clean water joint are sealed with the matched parameters and the sealing rings; and the rapid assembly and flexible disassembly of the working head are achieved through the cooperation of the base and the plug, and the connection of the hasps and lugs when not in use, so that the connection is stable and the use is convenient.

The shell is provided with the fast installation and anti-drop mechanism; and the sewage suction pipe, the water pipe and the control circuit of the nursing machine are integrated through the cooperation and connection of the nut sleeve, the first pipe joint, the second pipe joint and the hose sleeve, and then, the insulating hose is coated and connected to avoid the situation of water leakage, and the thread connection and coordination is fast and convenient, guaranteeing that the hose is not dropped freely from the main unit.

In the nursing machine, air enters the negative pressure assembly after being sucked by the highspeed fan, noise is absorbed through the acoustic foam in the negative pressure assembly, and denoising processing is performed again by the acoustic foam between the negative pressure assembly and the shell, thereby effectively eliminating the noise produced by the negative pressure source; and the bad consequence arisen from the waste pail being sucked to be flat due to pipeline blockage is avoided through the cooperation of protective measures of the pressure release valve and the electronic software.

In the nursing machine, water drops are dried by virtue of a centrifugal effect of the water removal apparatus and dewatered by sponge, thereby avoiding moisture from entering the negative pressure source; the liquid level sensor on the water storage cup plays a role of reminding and forced power-off protection through a controller; and the water separation ball in the base is floated to block the air outlet connecting pipe when an induction system is failed, guaranteeing the safe and service life of the nursing machine through multiple security and installation mechanisms.

Figure 1:
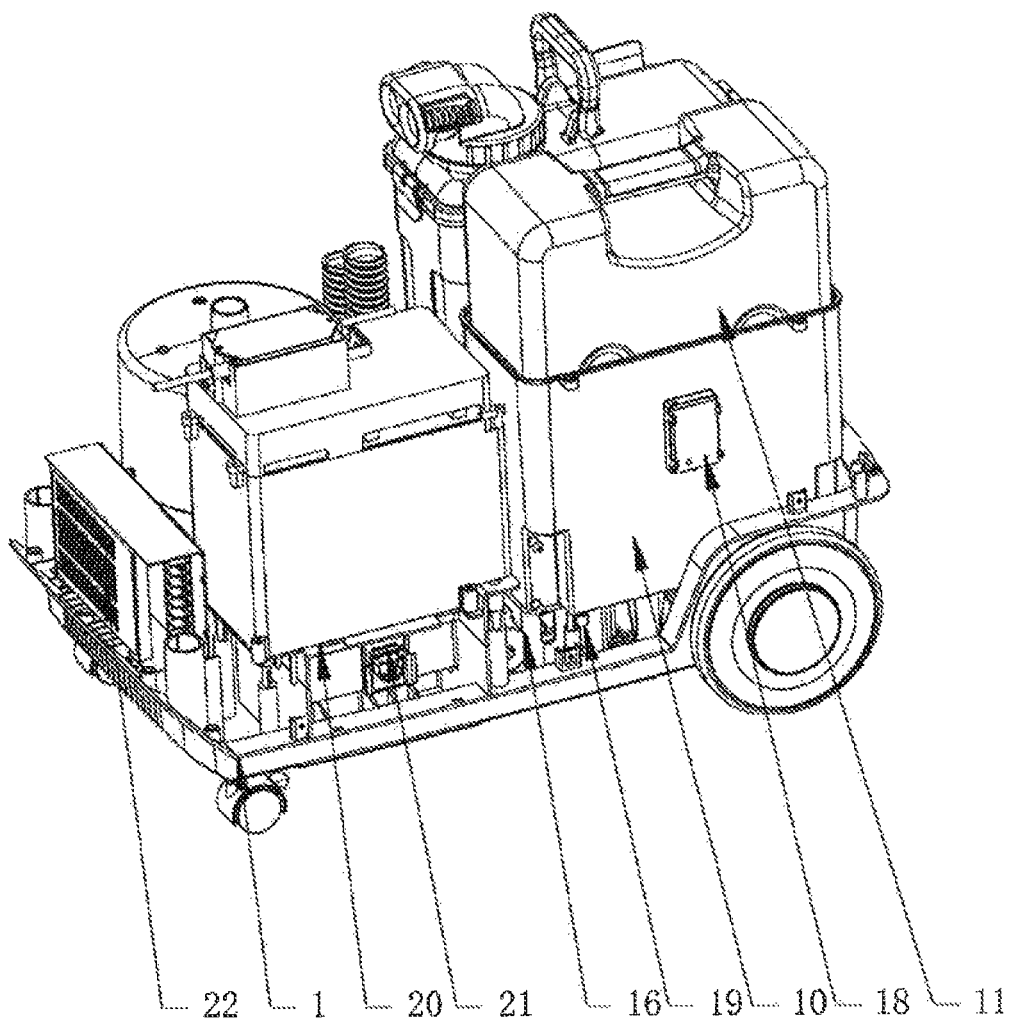
FIG. 1 is a first structural schematic diagram showing an interior of a main unit of the present disclosure.
Figure 2:
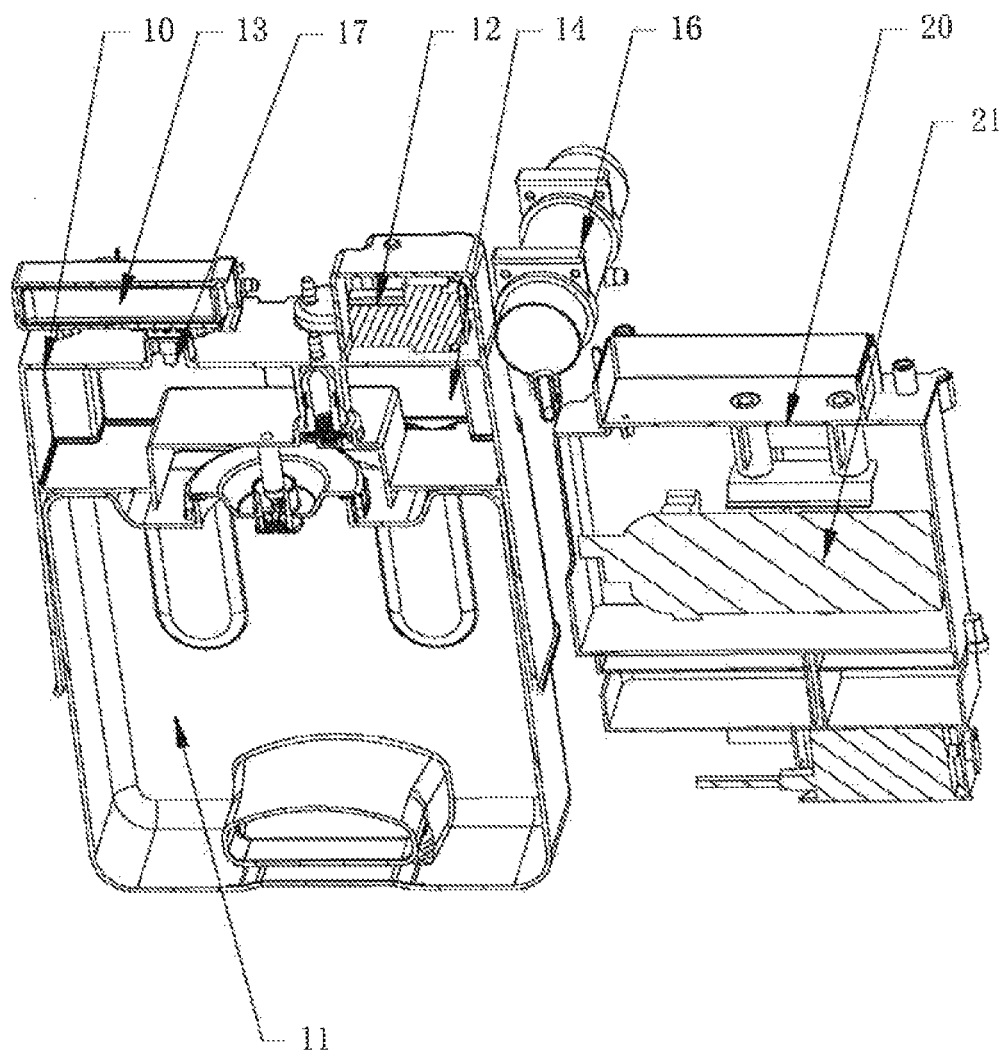
FIG. 2 is a structural schematic diagram showing a section of a water tank support of the present disclosure.
Figure 3:
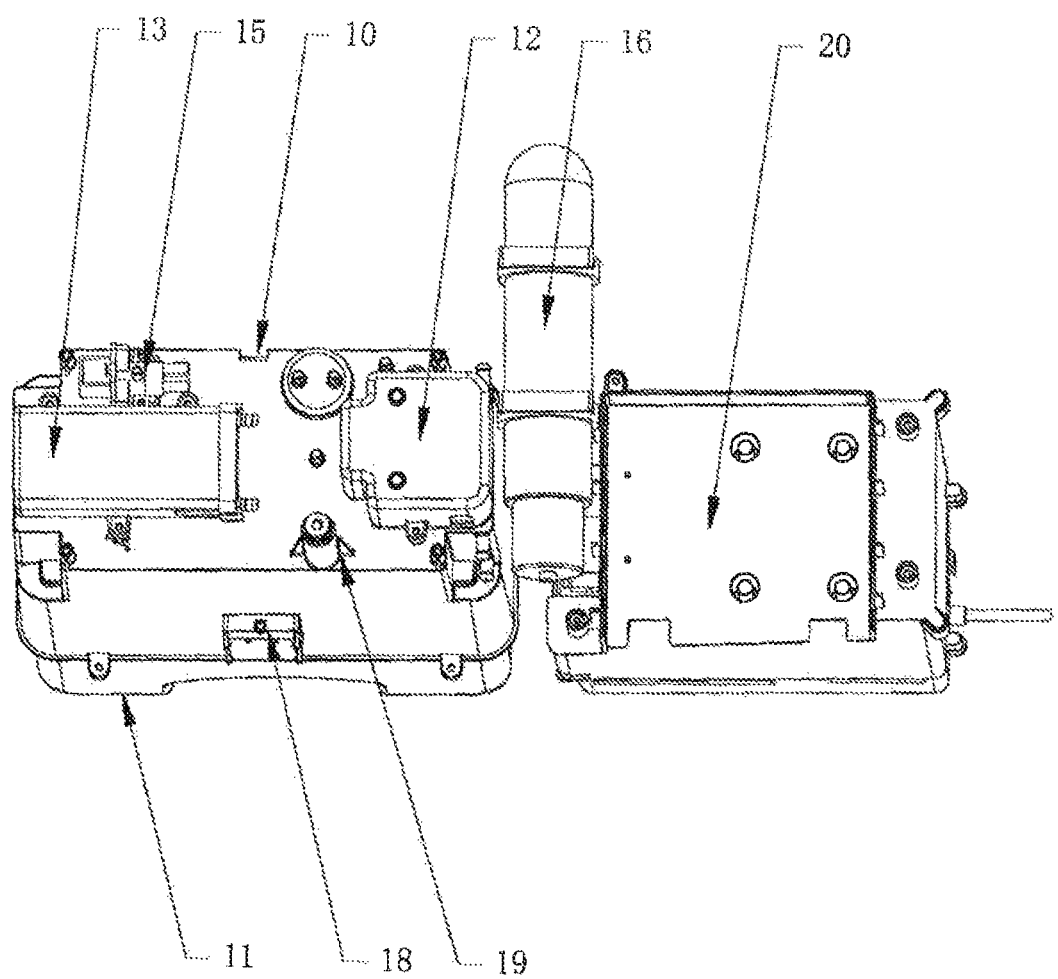
FIG. 3 is a structural schematic diagram showing a bottom surface of the water tank support of the present disclosure.
Figure 4:
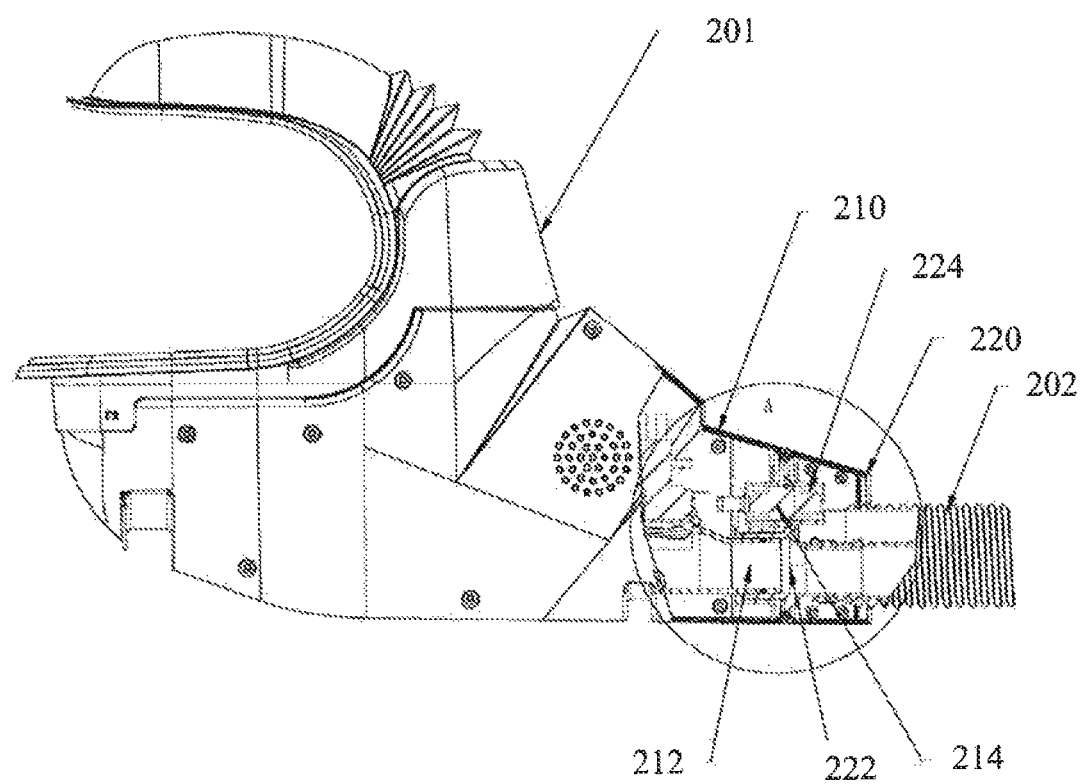
FIG. 4 is a structural schematic diagram showing a whole section of a fast connection structure of the present disclosure.
Figure 5:
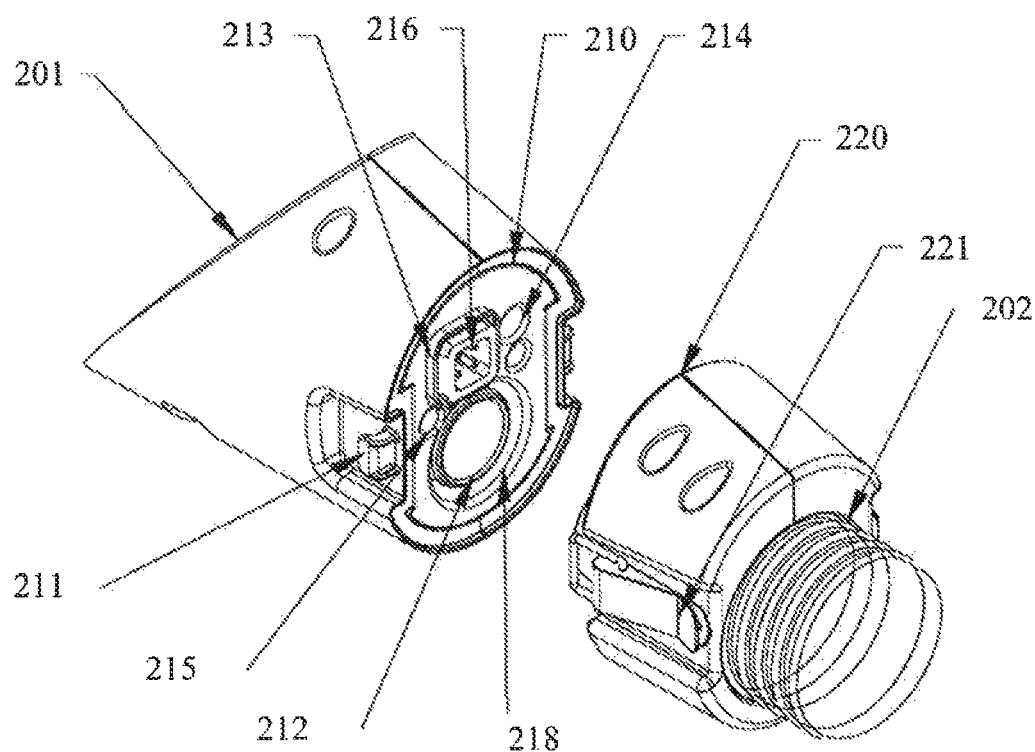
FIG. 5 is an oblique structural schematic diagram showing partial split of the fast connection structure of the present disclosure.
Figure 6:
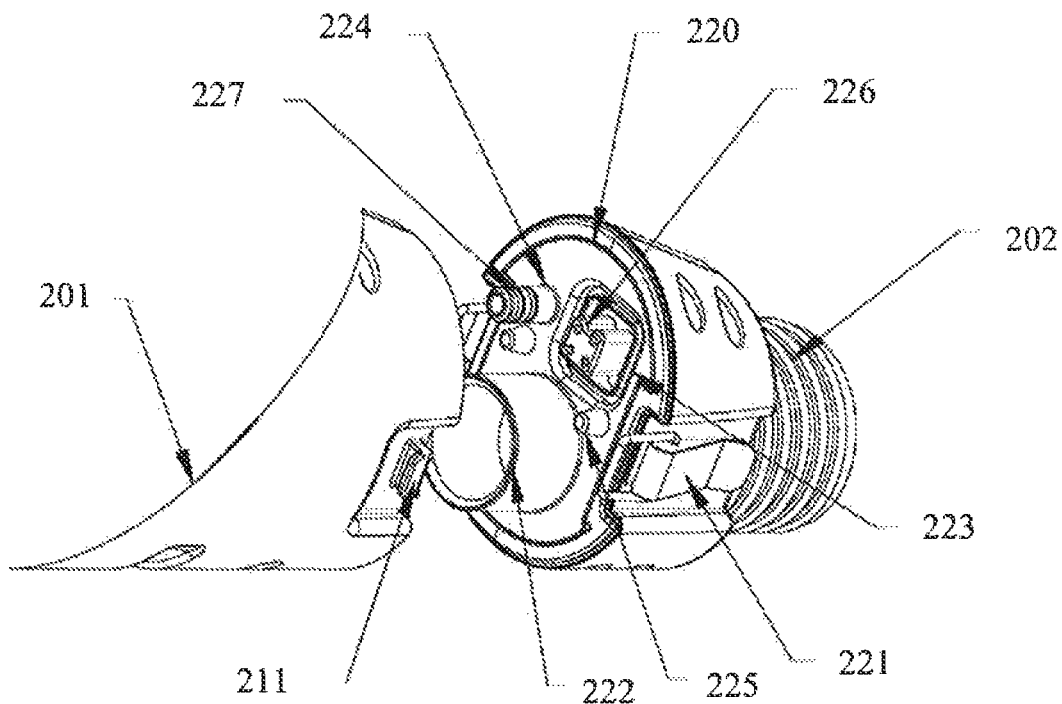
FIG. 6 another oblique structural schematic diagram showing partial split of the fast connection structure of the present disclosure.
Figure 7:
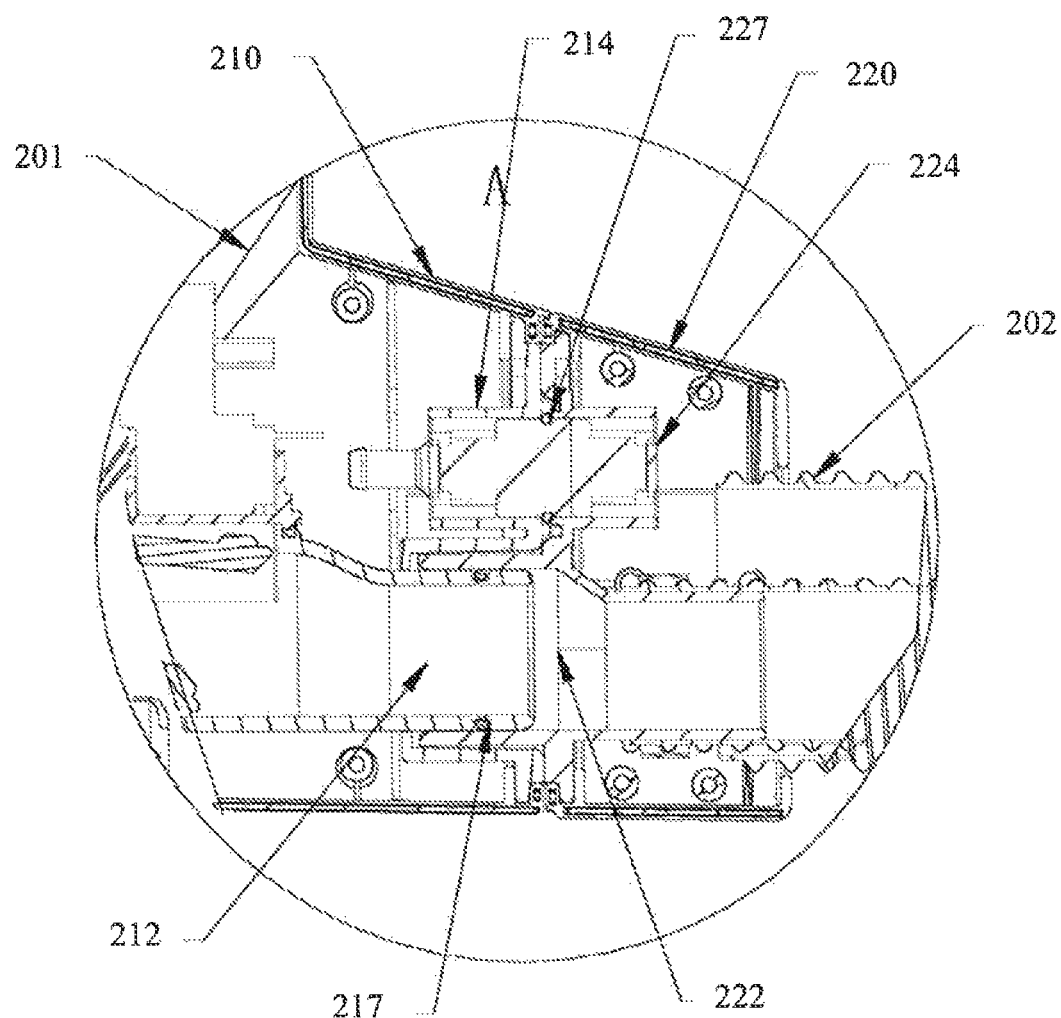
FIG. 7 is an enlarged structural schematic diagram showing a partial section of the fast connection structure of the present disclosure.
Figure 8:
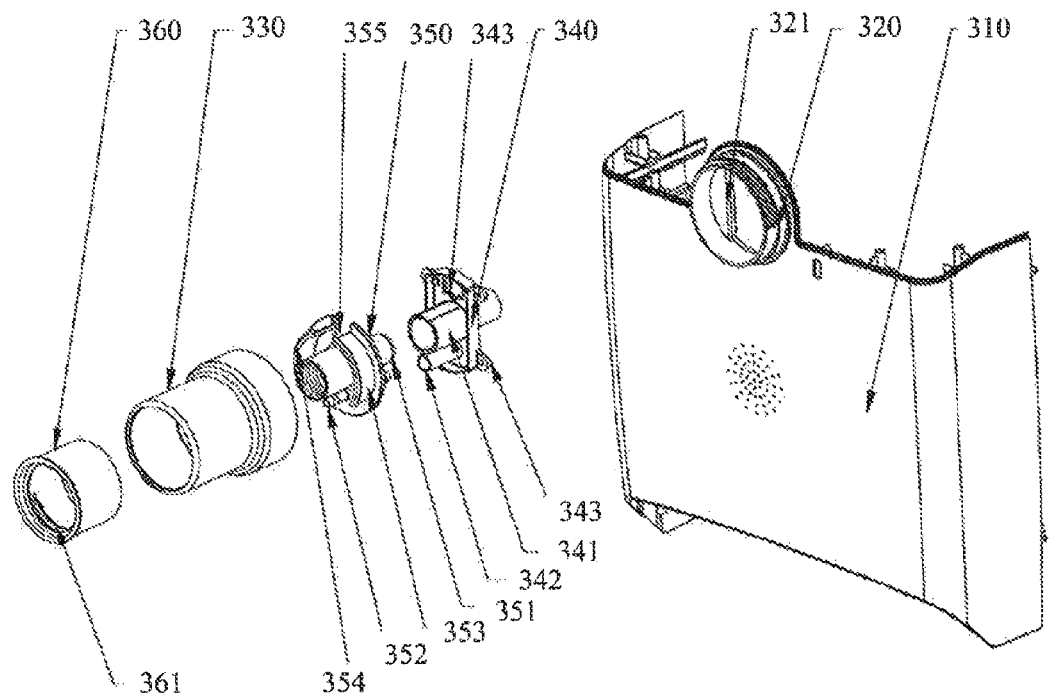
FIG. 8 is a schematic diagram showing a whole guarantee structure of a fast installation and anti-drop mechanism of the present disclosure.
Figure 9:
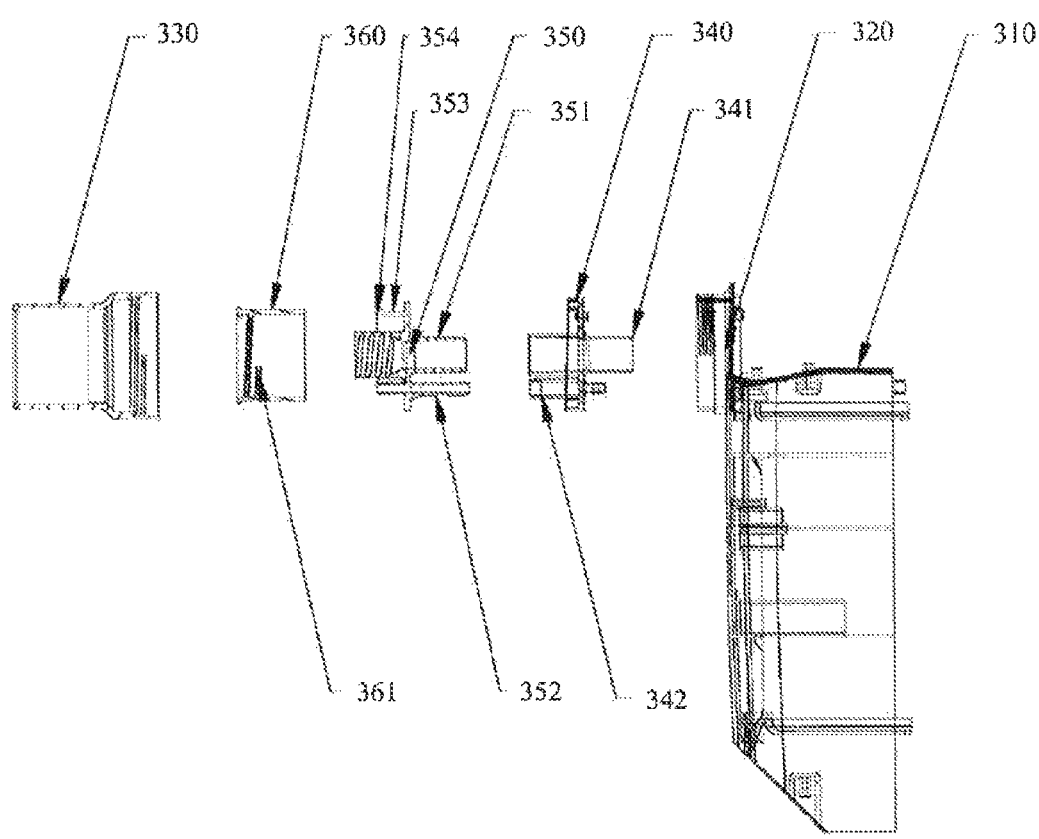
FIG. 9 is a structural schematic diagram showing a section of the fast installation and anti-drop mechanism of the present disclosure.
Figure 10:
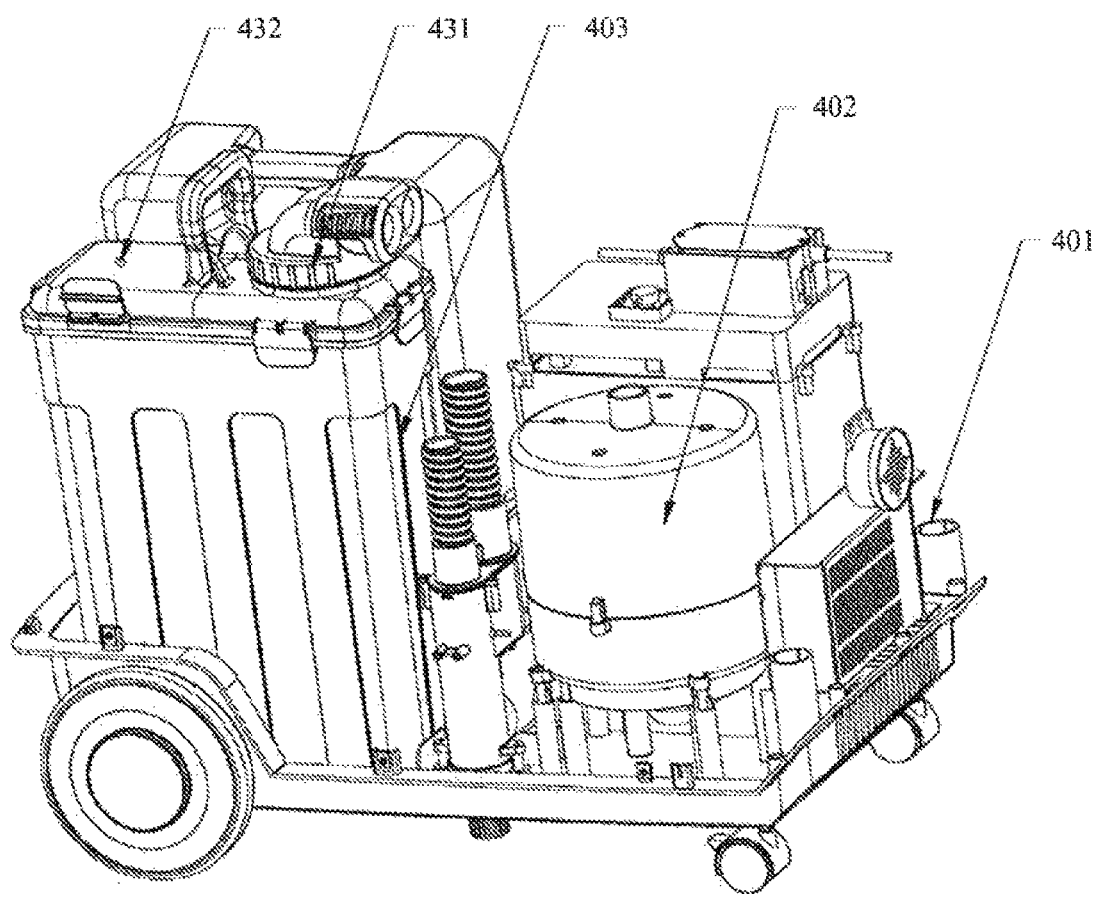
FIG. 10 is a second structural schematic diagram showing an interior of the main unit of the present disclosure.
Figure 11:
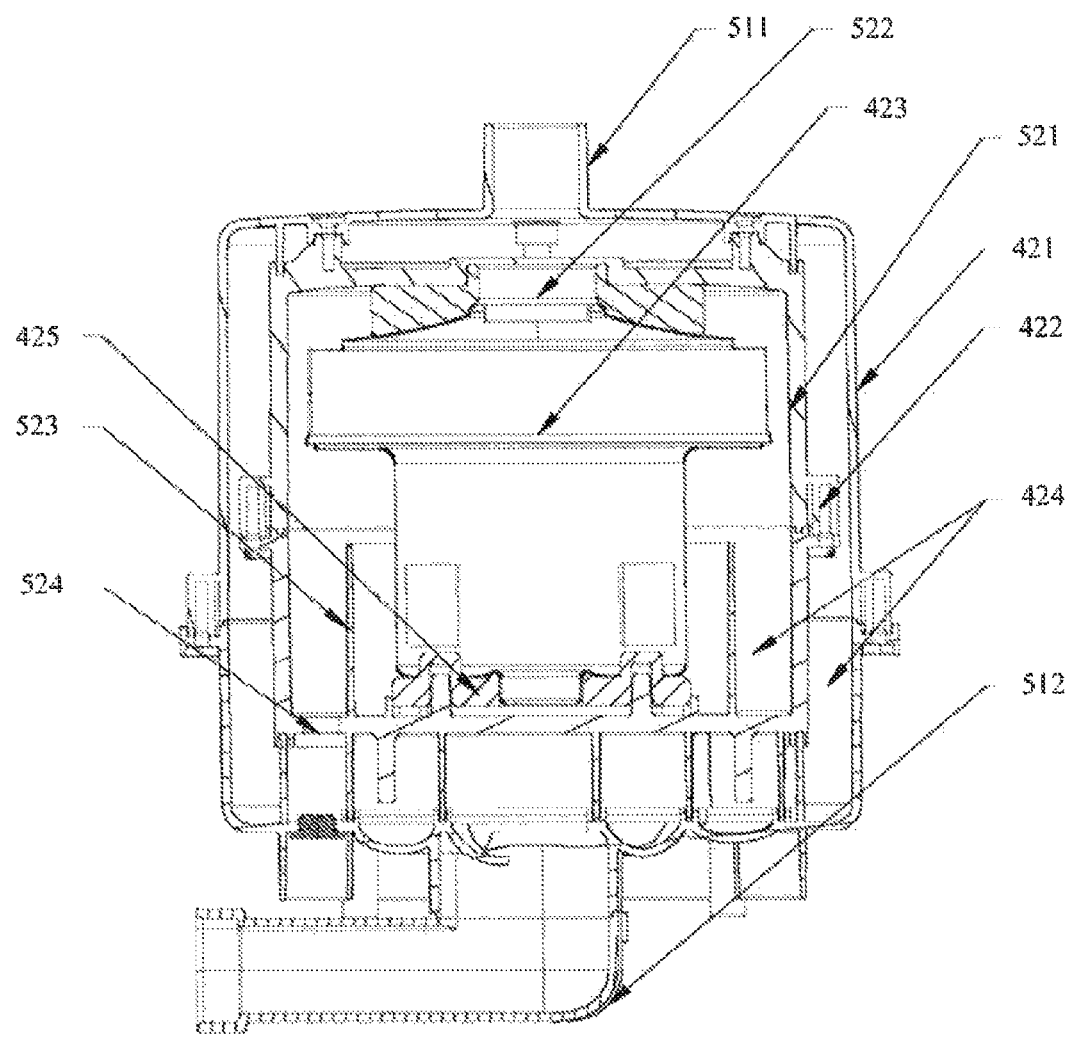
FIG. 11 is a structural schematic diagram showing a section of a negative pressure source of the present disclosure.
Figure 12:
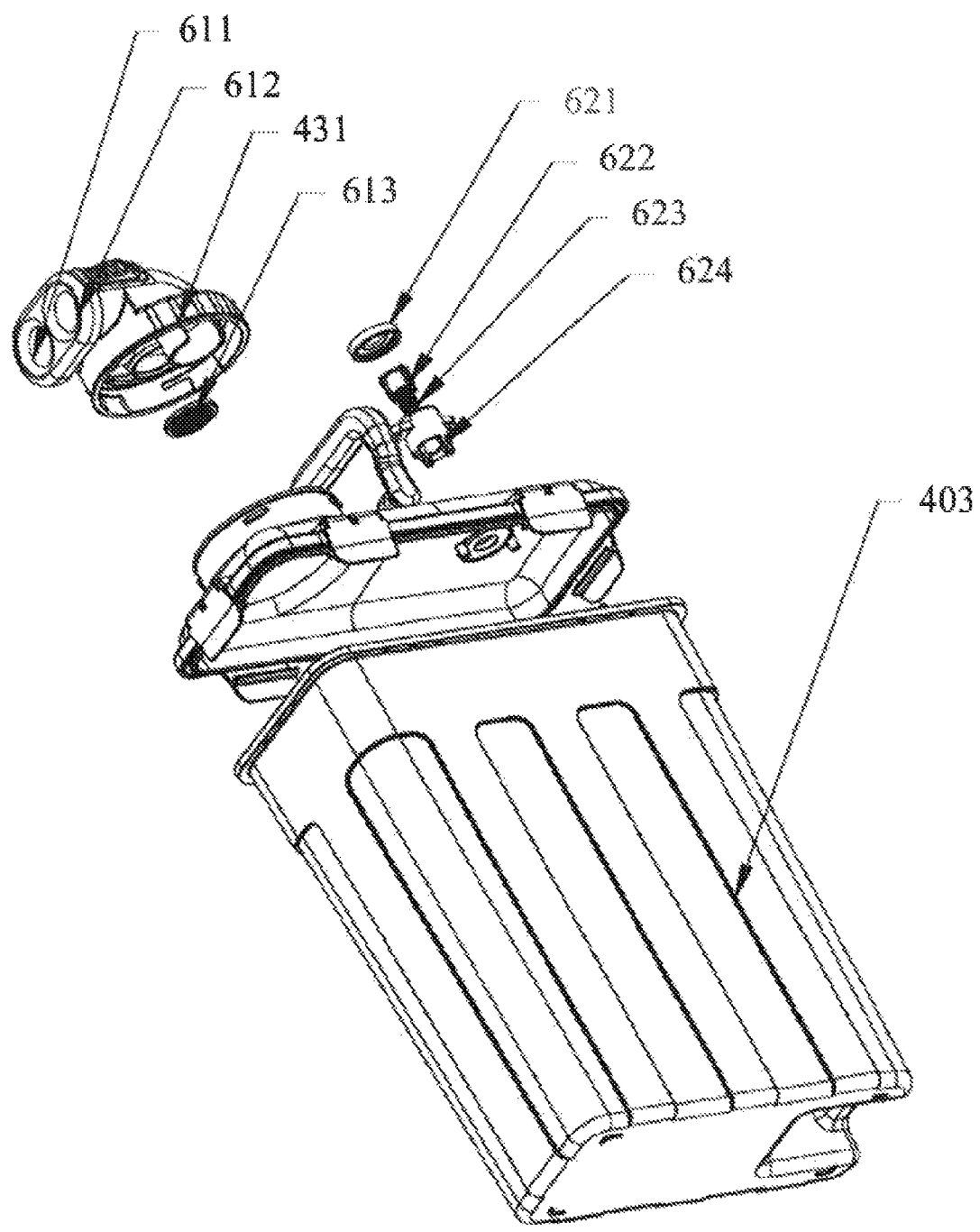
FIG. 12 is an exploded structural schematic diagram showing a waste pail of the present disclosure.
Figure 13:
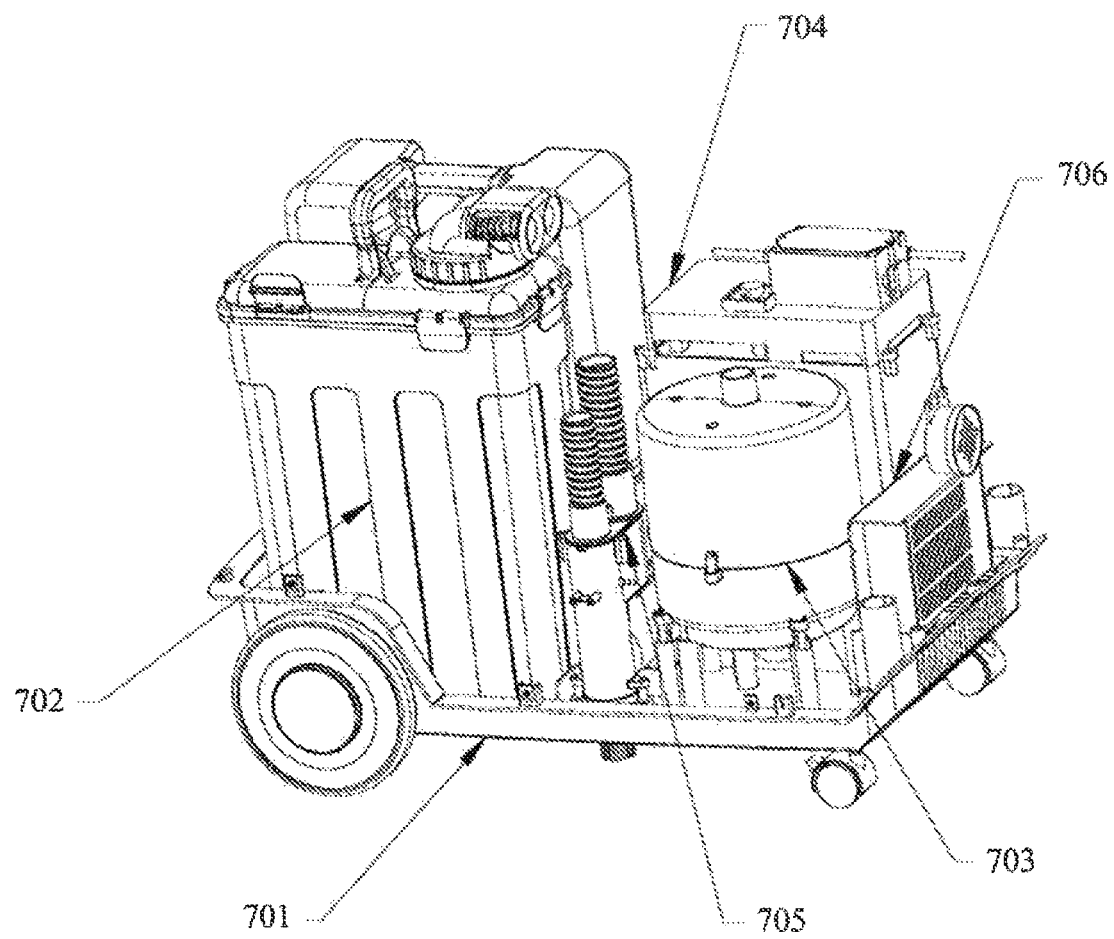
FIG. 13 is a third structural schematic diagram showing an interior of the main unit of the present disclosure.
Figure 14:
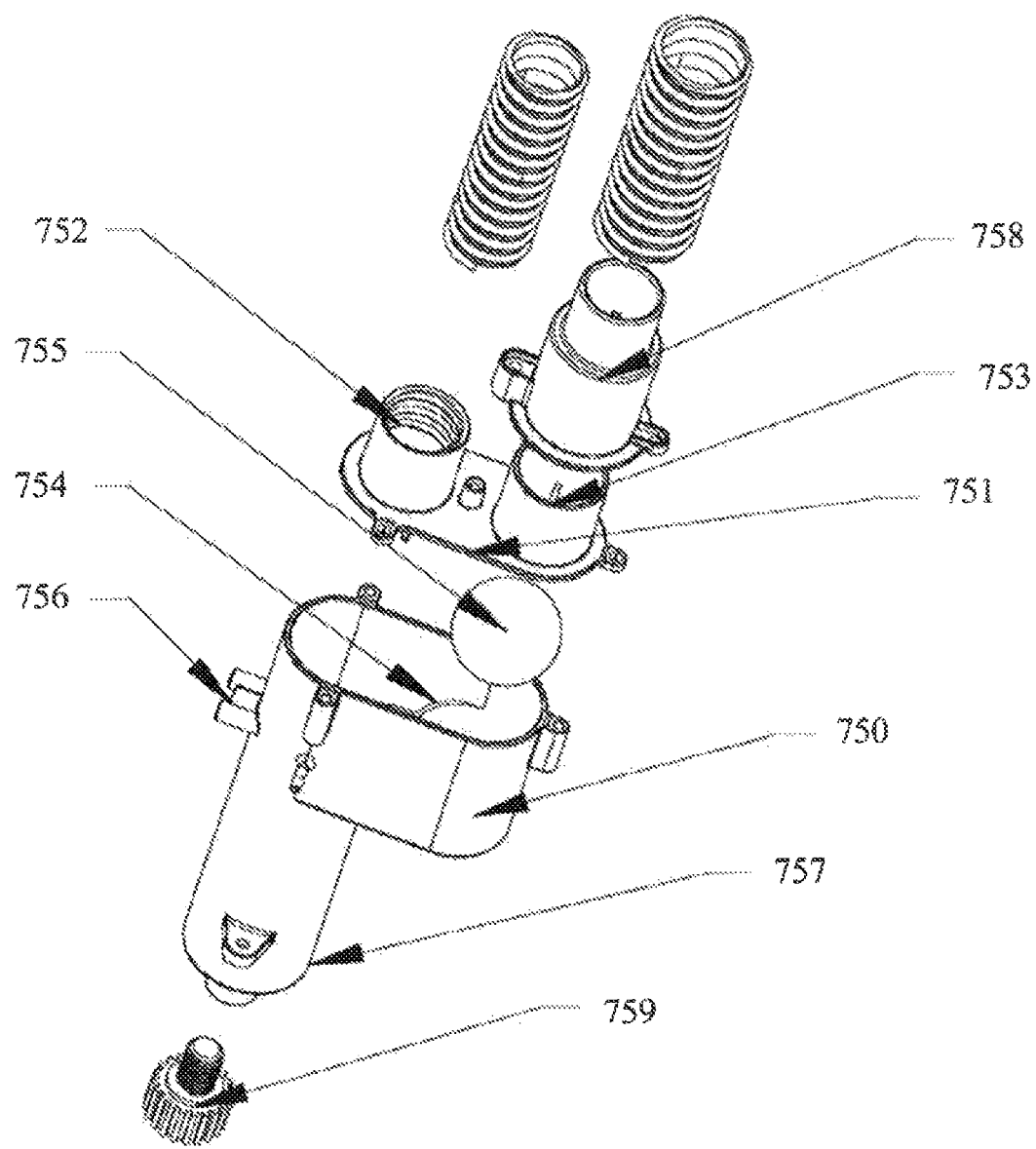
FIG. 14 is an exploded structural schematic diagram showing a water removal apparatus of the present disclosure.

In the figures:
1. main unit; 10. water tank support; 11. clean water tank; 12. small water pump;
13. PTC heater; 14. heating tank; 15. shunt valve; 16. sterilizer; 17. temperature sensor;
18. liquid level sensor; 19. blowdown valve; 20. water pump support;
21. big water pump; 22. main power supply; 201. working head; 202. hose; 210. base;
211. lug; 212. sewage port; 213. circuit port; 214. clean water port; 215. locating hole;
216. guide stripe; 217. first circular groove; 218. adaptive hole; 220. plug;
221. hasp; 222. sewage joint; 223. circuit joint; 224. clean water joint;
225. locating column; 226. guide groove; 227. second circular groove;
310. shell; 320. base; 321. baffle plate; 330. nut sleeve; 340. second pipe joint;
341. second casing pipe; 342. second water pipe; 343. pass line hole;
350. first pipe joint; 351. first casing pipe; 352. first water pipe; 353. stop collar;
354. guide tooth; 355. pass line groove; 360. hose sleeve; 361. limit tooth;
402. negative pressure source; 403. waste pail; 421. negative pressure source shell;
422. negative pressure assembly; 423. high-speed fan; 424. acoustic foam;
425. damping rubber mat; 431. adapter; 432. pressure release valve; 511. inlet air joint;
512. outlet air connector; 521. fan housing; 522. air duct pressing plate;
523. air duct baffle plate; 524. air duct outlet; 611. water inlet; 612. air outlet;
613. filter; 621. valve cover; 622. core plug; 623. spring; 624. valve body;
701. chassis; 702. polluted water bucket; 402. negative pressure source; 704. cleaning mechanism;
705. water removal apparatus; 706. power supply; 750. base; 751. upper cover plate;
752. air inlet connecting pipe; 753. air outlet connecting pipe; 754. baffle plate;
755. water separation ball; 756. liquid level sensor; 757. water storage cup; 758. joint;
759. drainage switch.

DETAILED DESCRIPTION

Further description is made to the present disclosure in combination with the drawings below.

A circulating hot water nursing machine of the present disclosure includes a main unit 1 and a working head. The working head is used for contacting a body of a patient to accommodate excrement, and a clear water spray nozzle and a drying apparatus are arranged on the working head. The main unit includes a movable chassis, on which an openable enclosure is arranged to facilitate cleaning and replacement, and the movable chassis can be flexibly moved to be convenient for a nursing person to maintain the nursing machine. A water tank support 10, a clean water tank 11, a small water pump 12 and a PTC heater 13 are arranged on the chassis of the main unit 1, wherein a heating tank 14 is arranged at a lower part of the water tank support 10, the clean water tank 11 is arranged at an upper part of the water tank support 10, a shunt valve 15 is arranged on the water tank support 10, water inlets of the shunt valve 15 are connected with the heating tank 14 and the clean water tank 11 through water pipes, respectively, and a water outlet of the shunt valve 15, the small water pump 12, the PTC heater 13 and the heating tank 14 are connected successively through water pipes. Firstly, the water inlet of the shunt valve 15 corresponding to the clean water tank 11 is opened, water in the clean water tank 11 flows via the small water pump 12 to the heating tank 14, and then, the shunt valve 15 switches over the water inlet to for an a backflow passage with the heating tank 14, the small water pump 12 and the PTC heater 13; and a control system and a main power supply 22 are arranged on the main unit 1, the small water pump 12, the PTC heater 13 and the shunt valve 15 are electrically connected with the main power supply 22 through the control system, respectively, and the control system starts up the small water pump 12 and the PTC heater 13 successively to circularly heat the water in the heating tank 14, thereby guaranteeing the constant water temperature output from the heating tank 14.

A UV sterilizer 16 is arranged on the main unit 1, connected with the water pipe arranged between the PTC heater 13 and the heating tank 14, and electrically connected with the control system. The water being circularly heated returns back to the heating tank 14 after being sterilized by the UV sterilizer 16.

A water pump support 20 is arranged at one side of the water tank support 10, a big water pump 21 is arranged in the water pump support 20 and connected with the heating tank 14 and the working head through water pipes, respectively, the water heated and sterilized in the heating tank 14 is extracted by the big water pump 21 to transport to the working head, and cleaning work is carried out through a plurality of spray nozzles arranged on the working head.

A liquid level sensor 18 is arranged on the clean water tank 11, a temperature sensor 17 is arranged on the heating tank 14, and the liquid level sensor 18 and the temperature sensor 17 are connected with the control system, respectively. The liquid level sensor 18 is used for monitoring a water level in the clean water tank 11 and sending a signal to a controller to remind the nursing person to add water when the water level is arrived at a warning water level, the temperature sensor 17 is used for monitoring the water temperature in the heating tank 14 and transmitting a data signal to the control system, and then, the control system starts up heating or water supplementing work according to a set procedure.

A blowdown valve 19 is arranged on a bottom surface of the heating tank 14, a filtering apparatus is arranged on a water injecting hole of the clean water tank 11, and the blowdown valve 19 is opened to discharge incrustation and other impurities in the clean water tank 11, thus, the quality of clean water in the nursing machine can be improved, preventing the impurities, dirt and others from damaging the apparatus using water.

The PTC heater 13 and the small water pump 12 are separately arranged and an insulating shell is arranged outside each of the PTC heater and the small water pump, and the above members are arranged isolatedly by the water tank support 10 and the water pump support 20, thereby avoiding water leakage and electric leakage to cause an accident, making better use of an internal. space, reducing overall volume, and being more safe and reliable in use.

The working head and the hose are connected through a fast connection structure, which includes a working head 201 and a hose 202. An excrement container, a water spraying mechanism and a control processor are arranged on the working head 201; a base 210 is arranged at a tail end of the working head 201; hangers 211 are arranged at two sides of the base 210; a sewage port 212, a circuit port 213 and a clean water port 214 are arranged on a back end face of the base 210; the sewage port 212 is connected with a discharge outlet of the excrement container on the working head 201; the circuit port 213 is connected with the control processor; the clean water port 214 is connected with the water spraying mechanism. A plug 220 is arranged at a front end of the hose 202 in a connecting manner, the front end face of the plug 220 is matched with the back end face of the base 210; hasps 221 are arranged at two sides of the plug 220 and each hasp includes a buckle plate and a buckle ring, wherein one end of the buckle plate is hinged with the plug 220, the back end of the buckle ring is movably connected on the buckle plate, then, the front ends of the buckle rings are nested in the lugs 211, the buckle plates are flipped back to make the plug 220 closely connect with the base 210. A sewage joint 222, a circuit joint 223 and a clean water joint 224 are arranged on a front end face of the plug 220, wherein the sewage joint 222 is connected with a sewage pipe in the hose 202, the circuit joint 223 is connected with a circuit wire in the hose 202, and the clean water joint 224 is connected with a clean water pipe in the hose 202. By virtue of the detachable connection structure between the base 210 and the plug 220, the working head 201 can be stored after disassembling with the hose 202 when in idle, and the hose 202 can be arranged spirally on the main unit of the nursing machine.

A plurality of locating holes 215 are formed in the back end face of the base 210, and symmetrically distributed along two sides of a center line of the base 210. A plurality of locating columns 225 are arranged on the front end face of the plug 220 and match with the plurality of locating holes 215 in a pairing manner. When the plug 220 is connected with the base 210, the locating columns 225 and the locating holes 215 are aligned and cooperated, thereby improving the assembly accuracy and connection speed; and after the locating columns 225 are inserted into the locating holes 215, the connection strength between the base 210 and the plug 220 can be improved by virtue of the cooperative relationship of the locating columns and the locating holes.

Each locating column 225 is arranged in a frustum structure with small at front and big at back, and a chamfer is formed at the edge of a port of the locating hole 215. The locating column 225 with the frustum structure has effect of adaptive adjustment when assembling, and then, it is easier for the locating column 225 to insert in the locating hole 215, thereby improving the assembly accuracy and speed.

A first circular groove 217 is formed on an outer edge of the sewage port 212, an O-type sealing ring is sheathed on the first circular groove 217, an inner diameter of the sewage joint 222 is matched with an outer diameter of the sewage port 212, an outer diameter of the O-type sealing ring is greater than that of the sewage port 212, and the O-type sealing ring is closely pressed to an inner wall of the sewage joint 222 due to deformation when the sewage joint 222 is nested in the sewage port 212, thereby improving the seal of connection between the sewage joint 222 and the sewage port 212.

An adaptive hole 218 is formed on the back end face of the base 210, the sewage port 212 is sheathed in the adaptive hole 218, the inner diameter of the adaptive hole 218 is matched with the outer diameter of the sewage joint 222, and the sewage joint 222 is inserted between the sewage port 212 and the adaptive hole 218, thereby improving the assembly accuracy and connection strength of the sewage joint 222 and the sewage port 212.

A second circular groove 227 is formed in an outer edge of the clean water joint 224, an O-type sealing ring is sheathed on the second circular groove 227, the outer diameter of the clean water joint 224 is matched with the inner diameter of the clean water port 214, and the seal of connection between the clean water joint 224 and the clean water port 214 is improved through the O-type sealing ring.

A guide stripe 216 is arranged on an inner wall of the circuit port 213, and a guide groove 226 matched with the guide stripe 216 is formed in an outer wall of the circuit joint 223, and when the circuit joint 223 is assembled with circuit port 213, the assembly accuracy is improved through a guidance effect of the guide groove 226 and the guide stripe 216.

A fast installation and anti-drop mechanism is arranged on a shell 310 of the main unit of the nursing machine, a base 320 is arranged on a panel of the shell 310 and internally provided with a through hole connected with two sides of the panel, a thread is arranged on an outer edge of a front end of the base 320, baffle plates 321 are arranged at two sides of the through hole in the base 320, and the two baffle plates 321 are arranged symmetrically and arranged at intervals. A nut sleeve 330, a hose sleeve 360, a first pipe joint 350 and a second pipe joint 340 are arranged on the base 320 in a connecting manner. A second casing pipe 341 and a second water pipe 342 are arranged on the second pipe joint 340, front ends of the second casing pipe 341 and the second water pipe 342 pass through the baffle plates 321, and the second pipe joint 340 is arranged pressing against the back sides of the baffle plates 321; the second pipe joint 340 is arranged at the back side of the panel and fixedly connected with the base 320, and the back end of the second water pipe 342 is connected with a water supply system in the main unit through a pipeline. A stop collar 353, a first casing pipe 351 and a first water pipe 352 are arranged on the first pipe joint 350, front ends of the first casing pipe 351 and the first water pipe 352 are arranged in the stop collar 353, a back end of the first casing pipe 351 penetrates through a front end of the second casing pipe 341, a back end of the first water pipe 352 penetrates through a front end of the second water pipe 342, the stop collar 353 is used for connecting and fixing the insulating hose, the sewage pipe penetrates through the first casing pipe 351, and the first water pipe 352 is provided with a sealing washer at the back end and then forms a passage by cooperation and connection with the second water pipe 342. A back end of the hose sleeve 360 is sheathed on the stop collar 353, and an insulating hose penetrates through the hose sleeve 360, sleeved in a connecting manner and coated and fixed on the stop collar 353. The nut sleeve 330 is sleeved on the hose sleeve 360, and a back end of the nut sleeve 330 is in thread connection with a front end of the base 320.

Guide teeth 354 are arranged on an outer edge of the front end of the stop collar 353, and limit teeth 361 are arranged on an inner wall of the hose sleeve 360, and the insulating hose is a threaded pipe and then forms threaded connection and cooperation with the guide teeth 354 and the limit teeth 361, thereby avoiding the free dropping of the hose and the main unit.

A pass line groove 355 is formed in the first pipe joint 350, and a pass line hole 343 is formed in the second pipe joint 340 at a position corresponding to the pass line groove 355, and a control circuit also can be arranged in the insulating hose and is connected with the a control system on the main unit after passing through the hose sleeve 360, the pass line groove 355 and the pass line hole 343.

A plurality of fixing holes 343 are formed inside the base 320 and at corresponding places of the second pipe joint 340, a limit groove is formed at the back end of the base 320, and the second pipe joint 340 is fixedly connected with the base 320 via screws passing through the fixing holes 343 after snapping in the limit groove.

Wave teeth are arranged on outer edges inside the first water pipe 352 and the second water pipe 342, a water pipe is nested on the wave teeth, and a greater amount of interference is presented and the wave teeth are pointy, thereby improving the seal of connection among the first water pipe 352, the second water pipe 342 and the water pipe, and avoiding the situation of water leakage.

The main unit 1 comprises a negative pressure source 402 and a waste pail 403. A pressure release valve 432 and an adapter 431 are arranged on a top cover of the waste pail 403, a water inlet 611 and an air outlet 612 are formed on the adapter 431, the water inlet 611 is connected with the working head through a water pipe, and the air outlet 612 is connected with the negative pressure source 402 through an air pipe. The negative pressure source 402 exhausts air so that a vacuum effect is formed in the waste pail 403, and then, sewage in the working head is sucked in the waste pail 403 via the water pipe. The pressure release valve 432 is used for releasing a vacuum pressure in the waste pail 403, thereby avoiding the consequences that the vacuum pressure is too high due to blockage of the pipeline between the waste pail 403 and the working head and the negative pressure source 402 is damaged due to the waste pail 403 being sucked to be flat.

The negative pressure source 402 includes a negative pressure source shell 421, a negative pressure assembly 422 and a high-speed fan 423, wherein an inlet air joint 511 is arranged at the upper end of the negative pressure source shell 421, an outlet air connector 512 is arranged at the lower end of the negative pressure source shell 421, the negative pressure assembly 422 is arranged in negative pressure source shell 421, and acoustic foam 424 is provided between an outer wall of the negative pressure assembly 422 and an inner wall of the negative pressure source shell 421. When the negative pressure source 402 works, the wind vibration and noise produced are absorbed by the acoustic foam 424 and then reduced effectively. The high-speed fan 423 is arranged in the negative pressure assembly 422, an air inlet at the upper end of the high-speed fan 423 is communicated with the inlet air joint 511 through the negative pressure assembly 422, an air outlet at the lower end of the high-speed fan is communicated with the outlet air connector 512 through the negative pressure assembly 422, and acoustic foam 424 is arranged in an inner cavity of the negative pressure assembly 422 between the air inlet and the air outlet of the high-speed fan. Air in the waste pail 403 is sucked by the high-speed fan 423, and then, enters the inner cavity of the negative pressure assembly 422 from the air outlet, and the noise is reduced after the wind passes through the acoustic foam 424 in the negative pressure assembly 422.

The above negative pressure assembly 422 includes a fan housing 521, wherein an air duct pressing plate 522 is arranged on a top surface of the fan housing 521, the upper end of the high-speed fan 423 is fixedly connected with the air duct pressing plate 522, and a connecting channel is formed on the air duct pressing plate 522 to communicate the inlet air joint 511 on the negative pressure source shell 421 and the air inlet of the high-speed fan 423. An annular air duct baffle plate 523 is arranged on a bottom surface of the fan housing 521, the lower end of the high-speed fan 423 is placed in the air duct baffle plate 523 and fixedly connected with the fan housing 521, and an air duct outlet 524 is formed on a bottom plate of the fan housing 521 outside the air duct baffle plate 523. The air sucked by the high-speed fan 423 enters the inner cavity of the fan housing 521 from the air outlet, flows upwards in the air duct baffle plate 523, and is discharged from the air duct outlet 524 after reversely flowing, and by virtue of the air duct baffle plate 523, a flowing route of air in the fan housing 521 is extended, so that the noise can be fully absorbed by the acoustic foam 424.

The acoustic foam 424 is provided between an outer face of the air duct baffle plate 523 and the fan housing 521, and the noise produced by air flow in the fan housing 521 is reduced by virtue of the acoustic foam 424.

A damping rubber mat 425 is arranged between the lower end of the high-speed fan 423 and the fan housing 521, and the vibration produced when the high-speed fan 423 works and the resonance produced when high-speed air flows are reduced through the absorption of the damping rubber mat 425.

The pressure release valve 432 includes a valve body 624, a valve cover 621, a core plug 622 and a spring 623, wherein the lower end of the valve body 624 passes through the top cover of the waste pail 403 and fixedly connected with the same, the valve cover 621 is in thread connection with the upper end of the valve body 624, a pressure relief hole is fainted on the valve cover 621, the core plug 622 can be vertically arranged in the valve body 624 and the upper end of the core plug 622 is arranged pressing against the pressure relief hole of the valve cover 621, the spring 623 is arranged between the lower end of the core plug 622 and the bottom surface of the valve body 624, and an air hole communicated with the waste pail 403 is formed on the valve body 624. The pressure in the valve body 624 is consistent with that in waste pail 403, the pressure in the valve body 624 is reduced when the negative pressure source 402 is vacuumized, and the core plug 622 is kept stable and blocks the pressure relief hole on the valve cover 621 by virtue of the spring 623. When the pressure in the waste pail 403 is too high due to the pipeline blockage and exceeds a pressure value of the spring 623, the air enters the waste pail 403 from outside, thereby avoiding that the waste pail 403 is sucked to be flat and preventing more serious consequence.

A filter 613 is arranged in a water inlet 611 of the adapter 431, and used for preventing foreign material from entering the waste pail 403.

The working head is used for contacting a body of a patient to accommodate excrement, and a clear water spray nozzle and a drying apparatus are arranged on the working head. The main unit includes a movable chassis 701, wherein an openable enclosure is arranged on the chassis 701 to facilitate cleaning and replacement, and the movable chassis 701 can be flexibly moved to be convenient for a nursing person to maintain the nursing machine. A polluted water bucket 702, the negative pressure source 402, a cleaning mechanism 704, a power supply 706 and the control system are arranged on the chassis 701, wherein a water inlet of the polluted water bucket 702 and the cleaning mechanism 704 are connected with the working head through a hose, respectively, the excrement collected by the working head is sucked in the polluted water bucket 702 via the hose, and the cleaning mechanism 704 transports the clear water to the working head after heating and disinfecting to clean the body of the patient. A water removal apparatus 705 is arranged between an air outlet of the polluted water bucket 702 and the negative pressure source 402, and when the negative pressure source 402 is started up, a negative pressure is formed in the polluted water bucket 702, and water drop and steam carried by the air in the polluted water bucket 702 are sucked in the negative pressure source 402 after being filtered by the water removal apparatus 705, thereby improving the safety performance during use. A deodorizing apparatus is arranged at an exhaust port of the negative pressure source 402, the negative pressure source 402 and the cleaning mechanism 704 are connected with the power supply 706 through the control system, respectively, and the nursing machine can be operated reasonably and safely by detecting and controlling the components through a program set by the control system.

The water removal apparatus 705 includes a base 750 and an upper cover plate 751, wherein the upper cover plate 751 is connected with an upper port of the base 750, a water storage cup 757 is arranged at a lower port of the base 750, an air inlet connecting pipe 752 and an air outlet connecting pipe 753 are arranged on the upper cover plate 751, the upper end of the air inlet connecting pipe 752 is connected with the polluted water bucket 702 through a hose, and the upper end of the air outlet connecting pipe 753 is connected with the negative pressure source 402 through a hose. When the negative pressure source 402 starts to exhaust, air in the polluted water bucket 702 enters the air inlet connecting pipe 752, aqueous air makes a turn in the inner cavity of the base 750, however, the water drop affected by a centrifugal force is thrown into the water storage cup 757, and then, the air discharged from the air outlet connecting pipe 753 enters the negative pressure source 402, thereby guaranteeing that the water drop does not enter the negative pressure source 402 to burn down the negative pressure source.

A joint 758 is connected at the upper end of the air outlet connecting pipe 753 and connected with the negative pressure source 402 through a hose, grid baffle plates are arranged in the air outlet connecting pipe 753 and the joint 758, and dry sponge is filled between the grid baffle plates and can further dry the moisture included in the dry air, thereby guaranteeing that the negative pressure source 402 works in a dry environment, avoiding the electric leakage due to moist, and improving the service life.

A liquid level sensor 756 connected with the control system is arranged at the water storage cup 757, the liquid level sensor 756 sends a drainage signal via the control system when the water in the water storage cup 757 reaches a design value, and a drainage switch 759 is arranged at the lower end of the water storage cup 757.

A baffle plate 754 is arranged in the base 750, the air inlet connecting pipe 752 and the water storage cup 757 are arranged at one side of the baffle plate 754 correspondingly from up to down, the air outlet connecting pipe 753 is arranged at the other side of the baffle plate 754, and a water separation ball 755 is arranged in the base 750 and at the same side of the baffle plate with the air outlet connecting pipe. Since the water separation ball 755 is arranged at same side as the air outlet connecting pipe 753 by the baffle plate 754, when the above sensor is failed, the control system goes wrong or the unattended operation is presented, a water level in the water storage cup 757 exceeds a warning line, and the water separation ball is floated to block the air outlet connecting pipe 753, thereby avoiding the occurrence of burndown and electric leakage accident of the negative pressure source 402.

All embodiments mentioned above are embodiments of the present disclosure, therefore, the equivalent change or modification made according to the structure, characteristics and principle stated in the scope of patent application of the present disclosure are included in the scope of the patent application of the present disclosure.

What is claimed is:

1. A circulating hot water nursing machine, comprising a main unit and a working head, wherein a water tank support, a clean water tank, a small water pump and a PTC heater are arranged on the main unit; a heating tank is arranged at a lower part of the water tank support, the clean water tank is arranged at an upper part of the water tank support, a shunt valve is arranged on the water tank support, water inlets of the shunt valve are connected with the heating tank and the clean water tank through water pipes, respectively, and a water outlet of the shunt valve, the small water pump, the PTC heater and the heating tank are connected successively through water pipes; a control system and a main power supply are arranged on the main unit, and the small water pump, the PTC heater and the shunt valve are electrically connected with the main power supply through the control system, respectively.

2. The circulating hot water nursing machine according to claim 1, wherein a UV sterilizer is arranged on the main unit, the UV sterilizer is connected with the water pipe arranged between the PTC heater and the heating tank, and the UV sterilizer is electrically connected with the control system.

3. The circulating hot water nursing machine according to claim 1, wherein a water pump support is arranged at one side of the water tank support, and a big water pump is arranged in the water pump support, and the big water pump is connected with the heating tank and the working head through water pipes, respectively.

4. The circulating hot water nursing machine according to claim 1, wherein a liquid level sensor is arranged on the clean water tank, a temperature sensor is arranged on the heating tank, the liquid level sensor and the temperature sensor are connected with the control system, respectively, and a blowdown valve is arranged on a bottom surface of the heating tank.

5. The circulating hot water nursing machine according to claim 1, wherein an insulating shell is arranged outside each of the PTC heater and the small water pump.

6. The circulating hot water nursing machine according to claim 1, wherein the working head and a hose employ a fast connection structure, a base is arranged at a tail end of the working head, hangers are arranged at two sides of the base, and a sewage port, a circuit port and a clean water port are arranged on a back end face of the base; and a plug is arranged at a front end of the hose in a connecting manner, hasps are arranged at two sides of the plug, and a sewage joint, a circuit joint and a clean water joint are arranged on a front end face of the plug.

7. The circulating hot water nursing machine according to claim 6, wherein a plurality of locating holes are formed on the back end face of the base, the plurality of locating holes are symmetrically distributed along two sides of a center line of the base; a plurality of locating columns are arranged on the front end face of the plug, and the plurality of locating columns match with the plurality of locating holes in a pairing manner.

8. The circulating hot water nursing machine according to claim 1, wherein a shell of the main unit is provided with a fast installation and anti-drop mechanism, the structure of which is as follows, a base is arranged on a panel of the shell, a thread is arranged on an outer edge of a front end of the base, baffle plates are arranged at two sides of an inner hole of the base, and a nut sleeve, a hose sleeve, a first pipe joint and a second pipe joint are arranged on the base in a connecting manner; a second casing pipe and a second water pipe are arranged on the second pipe joint, front ends of the second casing pipe and the second water pipe pass through the baffle plates, and the second pipe joint is arranged pressing against the back side of the baffle plate; a stop collar, a first casing pipe and a first water pipe are arranged on the first pipe joint, front ends of the first casing pipe and the first water pipe are arranged in the stop collar, a back end of the first casing pipe penetrates through a front end of the second casing pipe, and a back end of the first water pipe penetrates through a front end of the second water pipe; and a back end of the hose sleeve is sheathed on the stop collar, the nut sleeve is sleeved on the hose sleeve, and a back end of the nut sleeve is in thread connection with a front end of the base.

9. The circulating hot water nursing machine according to claim 8, wherein guide teeth are arranged on an outer edge of the front end of the stop collar, and limit teeth are arranged on an inner wall of the hose sleeve.

10. The circulating hot water nursing machine according to claim 8, wherein a pass line groove is formed on the first pipe joint, and a pass line hole is formed in the second pipe joint at a position corresponding to the pass line groove.

11. The circulating hot water nursing machine according to claim 1, wherein the main unit comprises a negative pressure source and a waste pail, a pressure release valve and an adapter are arranged on a top cover of the waste pail, a water inlet and an air outlet are formed on the adapter, the water inlet is connected with the working head through a water pipe, and the air outlet is connected with the negative pressure source through an air pipe; and the negative pressure source comprises a negative pressure source shell, a negative pressure assembly and a high-speed fan, wherein an inlet air joint is arranged at an upper end of the negative pressure source shell, an outlet air connector is arranged at a lower end of the negative pressure source shell, the negative pressure assembly is arranged in the negative pressure source shell, acoustic foam is provided between an outer wall of the negative pressure assembly and an inner wall of the shell, the high-speed fan is arranged in the negative pressure assembly, an air inlet at the upper end of the high-speed fan is communicated with the inlet air joint through the negative pressure assembly, an air outlet at the lower end of the high-speed fan is communicated with the outlet air connector through the negative pressure assembly, and acoustic foam is provided in an inner cavity of the negative pressure assembly between the air inlet and the air outlet of the high-speed fan.

12. The circulating hot water nursing machine according to claim 11, wherein the negative pressure assembly comprises a fan housing; an air duct pressing plate is arranged on a top surface of the fan housing, and the upper end of the high-speed fan is fixedly connected with the air duct pressing plate; and an annular air duct baffle plate is arranged on a bottom surface of the fan housing, the lower end of the high-speed fan is placed in the air duct baffle plate and fixedly connected with the fan housing, and an air duct outlet is formed on a bottom plate of the fan housing outside the air duct baffle plate.

13. The circulating hot water nursing machine according to claim 12, wherein acoustic foam is provided between an outer face of the air duct baffle plate and the fan housing.

14. The circulating hot water nursing machine according to claim 12, wherein a damping rubber mat is arranged between the lower end of the high-speed fan and the fan housing.

15. The circulating hot water nursing machine according to claim 11, wherein the pressure release valve comprises a valve body, a valve cover, a core plug and a spring, wherein the lower end of the valve body passes through the top cover of the waste pail and fixedly connected with the top cover, the valve cover is in thread connection with the upper end of the valve body, a pressure relief hole is formed on the valve cover, the core plug can be vertically arranged in the valve body and the upper end of the core plug is arranged pressing against the pressure relief hole of the valve cover, and the spring is arranged between the lower end of the core plug and the bottom surface of the valve body.

16. The circulating hot water nursing machine according to claim 11, wherein a filter is arranged in the water inlet of the adapter.

17. The circulating hot water nursing machine according to claim 1, wherein the main unit comprises a movable chassis; a polluted water bucket, the negative pressure source, a cleaning mechanism, a power supply and the control system are arranged on the chassis; a water inlet of the polluted water bucket and the cleaning mechanism are connected with the working head through a hose, respectively, wherein a water removal apparatus is arranged between an air outlet of the polluted water bucket and the negative pressure source; the water removal apparatus comprises a base and an upper cover plate, a water storage cup is arranged at a lower port of the base, the upper cover plate is connected with an upper port of the base, an air inlet connecting pipe and an air outlet connecting pipe are arranged on the upper cover plate, the upper end of the air inlet connecting pipe is connected with the polluted water bucket through a hose, the upper end of the air outlet connecting pipe is connected with the negative pressure source through a hose; and the negative pressure source and the cleaning mechanism are connected with the power supply through the control system, respectively.

18. The circulating hot water nursing machine according to claim 17, wherein a liquid level sensor connected with the control system is arranged at the water storage cup, and a drainage switch is arranged at a lower end of the water storage cup.

19. The circulating hot water nursing machine according to claim 17, wherein a baffle plate is arranged in the base, the air inlet connecting pipe and the water storage cup are arranged at one side of the baffle plate correspondingly from up to down, the air outlet connecting pipe is arranged at the other side of the baffle plate, and a water separation ball is arranged in the base and at the same side of the baffle plate with the air outlet connecting pipe.

20. The circulating hot water nursing machine according to claim 17, wherein a joint is connected at the upper end of the air outlet connecting pipe and connected with the negative pressure source through a hose, grid baffle plates are arranged in the air outlet connecting pipe and the joint, and dry sponge is filled between the grid baffle plates.

* * * * *